Feb. 20, 1951     H. E. EMIGH     2,542,123
AIRCRAFT LANDING GEAR STRUT
Filed April 23, 1948
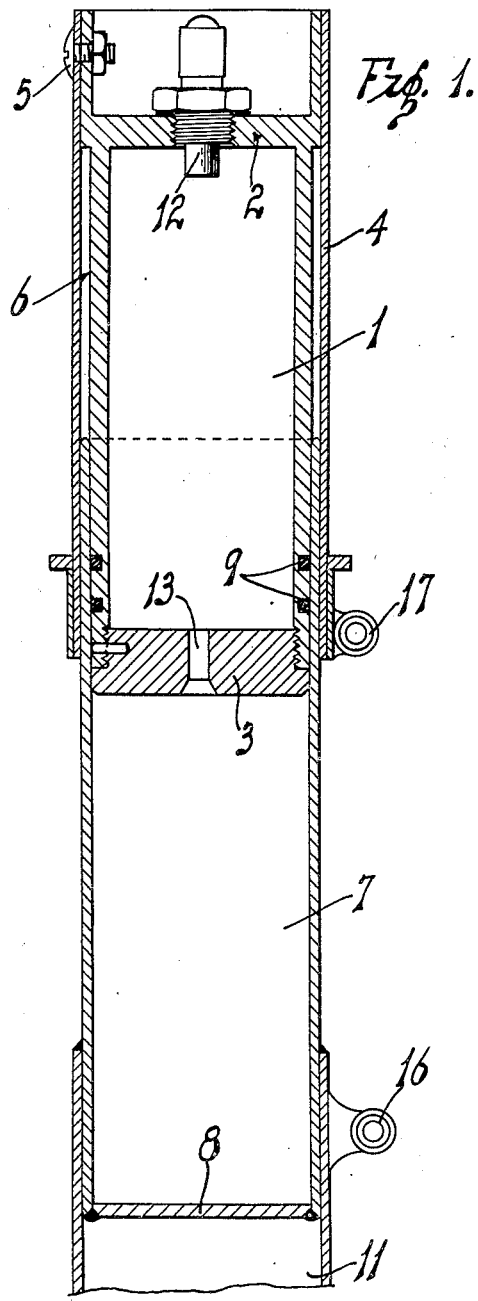
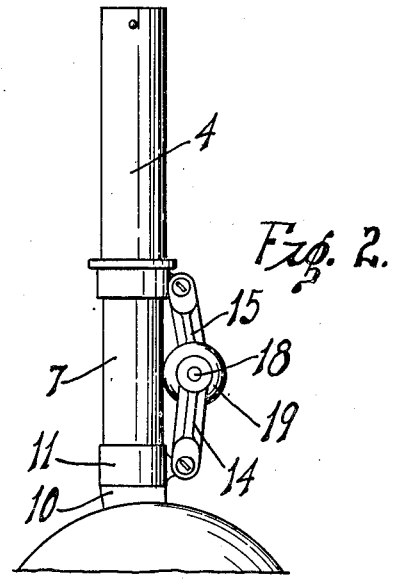
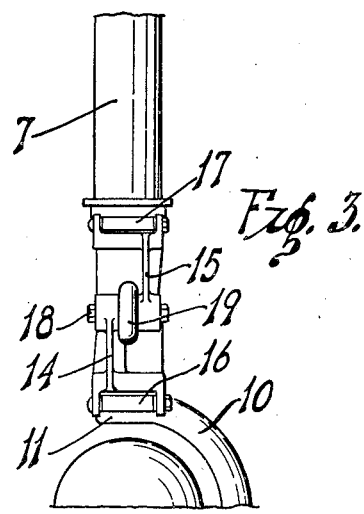
INVENTOR.
Harold E. Emigh.
BY
ATTORNEY.

Patented Feb. 20, 1951

2,542,123

UNITED STATES PATENT OFFICE 2,542,123

AIRCRAFT LANDING GEAR STRUT

Harold E. Emigh, Norwalk, Calif.

Application April 23, 1948, Serial No. 22,866

3 Claims. (Cl. 267—64)

This invention relates to an aircraft landing gear strut, and particularly of the hydraulic type.

An object of my invention is to provide a novel aircraft landing gear strut which is simple in construction, inexpensive to manufacture, and simple to assemble.

Another object of my invention is to provide a novel aircraft landing gear strut, which is provided with a bumper on the torque arms to eliminate noise as the strut extends, and also to prevent wear on the strut barrel.

Still another object of my invention is to provide a novel aircraft landing gear strut in which the hydraulic fluid is caused to surge through a fixed orifice as the strut collapses and extends in actual use.

Other objects, advantages and features of invention may appear from the accompanying drawing, the subjoined detailed description and the appended claims.

In the drawing:

Figure 1 is a longitudinal sectional view of the upper portion of my aircraft landing gear strut.

Figure 2 is a side elevation of my aircraft landing gear strut.

Figure 3 is a rear elevation of the same.

Referring more particularly to the drawing, the numeral 1, indicates a hollow piston, the upper end of which is closed by the wall 2, and the lower end is closed by the cap 3, which screws into the piston. An outer sleeve 4, is secured to the piston 1, at the upper end, by means of a plurality of bolts 5, which extend through the sleeve and the piston, substantially as shown. The piston 1, is reduced in diameter from a point parallel with the wall 2, to the bottom thereof, as shown at 6, thus providing an annular space to receive the cylinder, 7.

The cylinder 7, moves vertically in the space 6, as is usual in hydraulic struts. The lower end of the cylinder 7, is closed by a transverse wall 8, and this wall is preferably welded onto the bottom of the cylinder. Annular packing 9, is provided in the piston 1, and this packing engages the inside of the cylinder 7. With this arrangement the cylinder 7, can be ordinary tubing, and need not be finely finished. The fork 10, includes an integral cup 11, which fits onto the outside of the cylinder 7, and is welded onto the cylinder. The fork 10, carries the wheel in the usual manner. A pneumatic fitting 12, is threaded through the wall 2, so that air under pressure can be forced into the strut to act as a cushion against which the mass of fluid can push forces which are applied to the strut.

A fixed orifice 13, extends through the cap 3, and permits fluid to flow from the inside of the cylinder 7, to the piston 1, as the piston moves vertically with the forces which are applied to the strut. To keep the fork 10, in proper alignment, a pair of torque arms 14, 15, are provided, the torque arm 15, being pivotly mounted on the ear 16, and the torque arm 15, being pivotly secured to the ear 17. The two torque arms are pivotly secured together by the pin 18, and a rubber disc 19, is also mounted on this same pin, and is of a sufficient diameter to engage the outside of the cylinder 7, when the strut is extended as shown in Figure 2.

The sleeve 4, as well as the cylinder 7, is formed of standard tubular stock, and no fine finishing or grinding is necessary on either of these parts. In actual use, the cylinder 7, will be first fully collapsed, that is, the top of the cylinder will be at the top of the annular space 6. Oil under pressure is now forced through the fitting 12, and this pushes the hydraulic fluid with which the cylinder 7, is filled, downwardly until the strut has been properly extended. As a load is placed on the wheel, the cylinder 7, will tend to move upwardly causing hydraulic fluid to surge through the orifice 13. The movement of the hydraulic fluid will thus be restricted by the orifice and further, the air above the fluid will be compressed. The orifice 13, will have a damping effect in both directions of movement of the cylinder 7.

Having described my invention, I claim:

1. An aircraft landing gear strut comprising a cylinder, said cylinder being closed at the lower end and open at the upper end, a piston extending into said cylinder, a sleeve secured to said piston and extending over said cylinder, said piston being hollow and including a cap at the lower end thereof, said cap having an orifice extending therethrough, and a pneumatic fitting extending into the upper end of said piston, articulated torque arms connected to said cylinder and to said sleeve, and a bumper on said torque arms engageable with said cylinder in the extended position of the strut.

2. An aircraft landing gear strut comprising a cylinder, said cylinder being closed at the bottom and open at the top, a hollow piston extending into the cylinder, a sleeve bolted to said piston and extending over the cylinder, a cap threaded into the lower end of the piston, said cap having an orifice extending therethrough, a pneumatic fitting threaded into the upper end of said piston, and a fork fixedly attached to the lower end of said cylinder, articulated torque arms pivotly attached to said sleeve and to said cylinder, and a bumper mounted on said torque arms and engaging the cylinder in the extended position of the structure.

3. An aircraft landing gear strut comprising a cylinder, said cylinder being closed at the bottom and open at the top, a hollow piston extending into the cylinder, a sleeve bolted to said piston and extending over the cylinder, a cap threaded into the lower end of the piston, said cap having a fixed orifice extending longitudinally therethrough, a pneumatic fitting threaded into the upper end of said piston, a fork fixedly attached to the lower end of said cylinder, a pair of torque arms, a pin pivotally securing said arms together, means pivotally attaching one of said arms to said sleeve and the other of said arms to said cylinder, and a resilient disc mounted on said pin and engaging the cylinder in the extended position of the strut.

HAROLD E. EMIGH.

REFERENCES CITED

The following references are of record in the file of this patent:

UNITED STATES PATENTS

| Number | Name | Date |
|---|---|---|
| 2,150,495 | Dowty | Mar. 14, 1939 |
| 2,222,845 | Johnson | Nov. 26, 1940 |
| 2,243,782 | Thornhill | May 27, 1941 |
| 2,371,132 | Erle | Mar. 13, 1945 |